United States Patent [19]
Urban

[11] 3,867,630
[45] Feb. 18, 1975

[54] SENSOR FOR SUBMERSIBLE PROBES

[75] Inventor: Horst Urban, Nordenham, Germany

[73] Assignee: Norddeutsche Seekabelwerke Aktiengesellschaft, Nordenham, Germany

[22] Filed: July 20, 1972

[21] Appl. No.: 273,511

[30] Foreign Application Priority Data
Jan. 26, 1972 Germany............................ 2203475

[52] U.S. Cl............. 250/239, 33/DIG. 3, 73/170 A, 161/6, 161/36, 161/42, 161/146, 161/196, 161/213, 250/573, 340/4 R, 340/189, 340/190, 350/319
[51] Int. Cl......................... G01n 21/22, G02b 5/00
[58] Field of Search......... 250/218, 239; 340/4, 4 B, 340/189, 190, 191; 33/DIG 3; 73/170 A; 117/12 HC, 37 R; 350/319; 161/196, 213, 6, 42, 36, 146

[56] References Cited
UNITED STATES PATENTS

| | | |
|---|---|---|
| 1,561,149 | 11/1925 | Gage .................................... 161/6 |
| 2,261,190 | 11/1941 | Shropshire ......................... 250/218 |
| 2,750,794 | 6/1956 | Downs ............................. 73/170 A |
| 2,866,379 | 12/1958 | Veit .................................... 250/218 |
| 3,226,557 | 12/1965 | Goodman ........................... 250/239 |
| 3,263,553 | 8/1966 | Baruck............................... 250/218 |
| 3,278,753 | 10/1966 | Pitts et al. ........................... 250/218 |
| 3,417,251 | 12/1968 | Leonard et al. .................... 250/218 |
| 3,472,593 | 10/1969 | Drinkwater ........................ 250/218 |
| 3,514,612 | 5/1970 | DeGraffenried .................... 250/218 |

Primary Examiner—George F. Lesmes
Assistant Examiner—J. Cannon
Attorney, Agent, or Firm—Michael S. Striker

[57] ABSTRACT

A sensor body has an outer peripheral exposed surface, and is provided thereon with a plurality of discrete spots on an anti-fouling substance, with each of the spots being separate and spaced from the respective adjacent spots.

6 Claims, 1 Drawing Figure

PATENTED FEB 18 1975
3,867,630
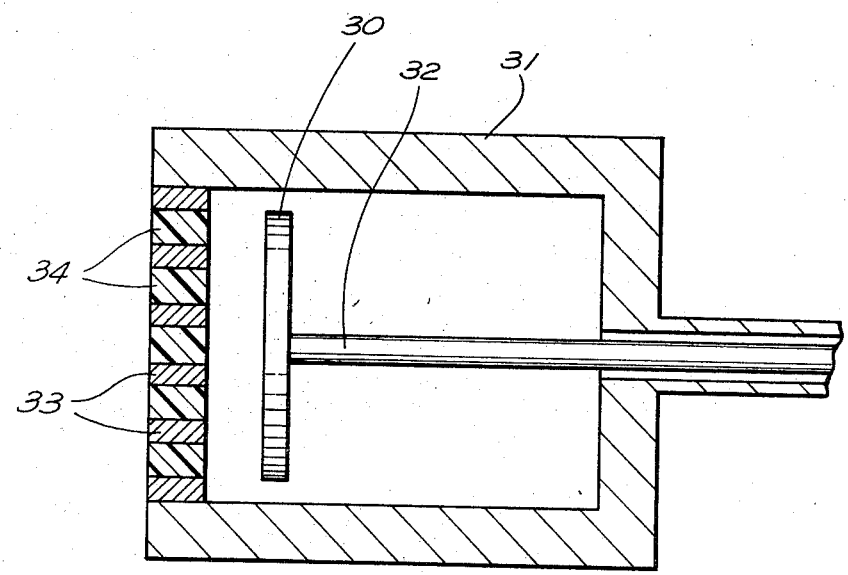

SENSOR FOR SUBMERSIBLE PROBES

BACKGROUND OF THE INVENTION

The present invention relates generally to sensors, and more particularly to sensors for submersible probes. Still more particularly the invention relates to a sensor for submersible probes which is provided with a mechanically relatively rigid and/or electrically conductive antifouling substance.

It is well known that fouling of ship's hulls and the like occurs over a period of time, due to the encrustation with algae, marine life and the like. Because of various disadvantageous effects this has, including upon the speed of the vessel, it is known to cover the hulls with socalled anti-fouling paint, that is paint which incorporates poison or copper powder and which at least for a certain time prevents the growth of such organisms on the hull.

The problem exists, however, not only on ship's hulls but also on submersible probes, that is underwater probes. Heretofore the use of such probes has been predominantly restricted to exploration vessels where the probes were lowered into the sea for relatively short periods of time. In such applications the vessel is usually stationary and the probe is lowered to a desired depth, or else, if the vessel moves, the probe is trailed behind it. Because of the brief periods of time for which such probes were submerged, fouling problems did not occur since growths of algae or marine life on the probes could not develop over such short periods of time, aside from the fact that the movement of the probe during the time it remained in the water tended to prevent such growth.

However, this is not true in the case of probes which are stationary and which remain submerged for prolonged periods of time, as is becoming more customary in underwater exploration. In such cases the growth of fouling organisms on the probes assumes importance, especially because in most instances the development of such growth tends to disadvantageously influence the proper functioning of the probe itself, or rather of the sensors which are associated with the probe.

It is of course known from the art to utilize alloys of copper which either entirely prevent or at least significantly retard the growth of such fouling organisms. However, these copper alloys are mechanically relatively rigid and electrically conductive. While it is possible to coat such sensors with such alloys, thereby preventing or at least substantially preventing the growth of fouling organisms on the sensors, many applications exist in which the use of such a coating disadvantageously influences the physical and/or electrical operation of the probe, and may lead to registration of wrong results. Evidently, this would be an unacceptable exchange of one difficulty for another.

SUMMARY OF THE INVENTION

It is, accordingly, an object of the present invention to provide an improved sensor for submersible probes, which is not possessed of the disadvantages outlined above.

More particularly it is an object of the invention to provide such an improved sensor which is protected against fouling by the growth of algae or other marine organisms over a prolonged period of time, but wherein the anti-fouling protection employed does not disadvantageously influence the proper functioning of the sensor itself.

This is true in particular of the protection of sensors which must be capable of performing optical measurements or light measurements in the water, and where the fouling of the sensor bodies would disadvantageously influence the proper operation. The invention has therefore as its particular object to provide such a sensor in which the provision of the anti-fouling means does not, even over a longer period of time, cause any changes in the quantity of light which can reach the optically active component of the sensor, that is which does not disadvantageously influence the measurements taken by the sensor.

In pursuance of these objects, and of others which will become apparent hereafter, one feature of the invention resides in a sensor for submersible probes which, briefly stated, comprises a combination of a sensor body and a plurality of discrete spots of an anti-fouling substance provided on the sensor body, with each of the spots being separate and spaced from respective adjacent spots.

The term "spots" as employed herein is not intended to be restricted to dots or the like, but it intended to designate a configuration in which each quantity of anti-fouling substance in effect constitutes an island which is entirely separate and spaced from any adjacent spots. In other words, no configurational or dimensional relationship is intended to be expressed by the term "spots."

The anti-fouling substance employed may be relatively stiff in its mechanical characteristic but, if employed in the manner according to the present invention, this does not influence the mechanical deformability of the sensor body, which is frequently important, especially if the sensor body must have such deformability in order to be able to properly measure certain physical parameters. Moreover, even if the sensor is intended for measuring of electrical values, where a partially or completely closed coating or sheath or metallic material or of conductive material would disadvantageously influence the sensed results, the present invention avoids these problems. It will be appreciated that the subdivision of the spots and their dimensions and configurations can be readily accommodated to the mechanical and/or electrical requirements made of the sensor.

In many instances it will be sufficient to suppress the conductivity of the surface of the sensor body only in a certain direction, or to permit its mechanical deformability in a specific direction. In such instances the spots may be in strip-shaped configuration, oriented in accordance with the desired direction.

If a strip-shaped configuration is chosen, then it may be advantageous if strips of the anti-fouling substance alternate with strips of an elastic and/or electrically insulating material, a construction which is particularly resistant to attack or damage. The direction in which the strips are oriented will depend upon the electrical and/or mechanical requirements made of the particular sensor, and the strips of elastic and/or electrically insulating material may be very narrow so that an advantageous relationship of protected (against fouling) to unprotected surface area is obtained.

By resort to the present invention up to and in excess of 90 percent of the exposed surface of the sensor body can be covered with anti-fouling substance without causing the problems which have been outlined above with respect to what is known. If copper alloys are used, especially those having between 80–85 percent of copper and between 20 and 15 percent of manganese, where small quantities of iron between 0.5–1.5 percent, or nickel between 0.3–1.0 percent may be present as traces, a fouling due to the growth of algae or other marine organisms is largely prevented.

Examples of the complete composition of a copper alloy are: copper 85 percent, manganes 14 percent, iron 1 percent; copper 80 percent, manganese 19 percent, nickel 1 percent; copper 82 percent, manganese 17.5 percent, iron 0.5 percent.

The sensor, being of the type which has to perform optical or light measurements, may have material of light-transmissive characteristic located between the adjacent spots of anti-fouling substance. The entry of light to the interior of such sensors usually takes place via optical windows which simultaneously constitute a protection against the entry of water into the interior of the sensor body. In such a case it is sufficient to protect the window alone against the growth of algae, that is against fouling, by resorting to the present invention because the remainder of the sensor body need not be so protected.

The light-transmissive material itself may be a synthetic plastic or glass, with the material chosen depending largely upon the particular requirements of a given instance. If a synthetic plastic material is chosen, then the material can be so chosen as not only to be light-transmissive but also to be elastically deformable if this is desired. It is possible to coat the sensor at least at the optically active locations thereof with a coating of the light-transmissive synthetic plastic material and to provide the coating in turn with the spots of anti-fouling substance.

Of course, the anti-fouling substance can have a thickness corresponding to the thickness of the layer of synthetic plastic material, in which case alternating areas, strips or the like of anti-fouling substance and synthetic plastic material can be provided to make up the coating or the window through which light is to pass. It is, however, evidently possible to provide the anti-fouling substance only on that exposed side of the window or coating of synthetic plastic material which is in contact with the water when the sensor is immersed. For instance it is possible to obtain a number of individual discrete "spots" in a simple manner by threading bolts or the like of an appropriate copper alloy to a certain depth into a light-transmissive window, by embedding them therein or by securing them in other suitable manner. This not only assures that the window is watertight but also assures a mechanically reliable connection of the bolts with the material of the window. The bolts, pins or the like can also extend beyond the exposed outer surface of the window, whether the same be of plastic or glass, to a greater or lesser extent as desired, to thereby further increase the anti-fouling effect.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a sectional view, illustrating an embodiment of the invention in a diagrammatic showing.

DESCRIPTION OF THE PREFERRED EMBODIMENTS

The embodiment illustrated in the FIGURE is of a sensor in which optical or light measurements are to be carried out. The sensor in this instance has a light sensitive element 30 which is accommodated in a housing or sensor body 31. An optical window, which is connected in fluidtight manner with the body 31 in accordance with features known from the art, is juxtaposed with the light-sensitive element 30 so that light can enter through the window to the element 30.

According to the invention the optical window is composed of alternating strips or lamellae of light-transmissive material 34 (synthetic plastic or glass) and strips ("spots") of an anti-fouling substance 33. The substance 33 may be of copper alloy as mentioned previously, which not only has the desired anti-fouling properties but also can be readily obtained, being available without difficulties and being inexpensive. It will be seen that in this manner up to or more than 90 percent of the surface of the window may be covered with the anti-fouling substance.

It will be understood that each of the elements described above, or two or more together, may also find a useful application in other types of constructions differing from the types described above.

While the invention has been illustrated and described as embodied in a sensor for submersible probes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a sensor for submersible probes to be used in a fouling environment, a combination comprising a sealed housing having a window portion and defining an enclosed space; and a sensor accommodated in said space and facing said window portion, said window portion having a surface exposable to said fouling environment, and being composed of alternating lamellae of light-transmissive substance for admitting light from said environment into said space, and of anti-fouling copper alloy for preventing fouling of said light transmissive lamellae, said copper alloy lamellae having a combined exposed surface area amounting to substantially 90 percent of said exposable surface of said window portion.

2. A combination as defined in claim 1, wherein said light-transmissive substance is a synthetic plastic material.

3. A combination as defined in claim 1, wherein said light-transmissive substance is glass.

4. A combination as defined in claim 1, wherein said copper alloy lamellae project outwardly beyond said outer surface.

5. A combination as defined in claim 1, wherein said copper alloy is composed predominantly of 80–85 percent copper and 20–15 percent manganese.

6. A combination as defined in claim 5, wherein said copper alloy further comprises trace quantities of iron or nickel.

* * * * *